FERTILITY COMPUTING DEVICE

Filed May 21, 1949 5 Sheets-Sheet 1

INVENTOR.

George H. Lee

INVENTOR.
George H. Lee

INVENTOR.
George H. Lee

June 16, 1953 G. H. LEE 2,642,225

FERTILITY COMPUTING DEVICE

Filed May 21, 1949 5 Sheets-Sheet 4

INVENTOR.

George H. Lee

June 16, 1953

G. H. LEE 2,642,225

FERTILITY COMPUTING DEVICE

Filed May 21, 1949

5 Sheets-Sheet 5

INVENTOR.

George H. Lee

Patented June 16, 1953 2,642,225

UNITED STATES PATENT OFFICE 2,642,225

FERTILITY COMPUTING DEVICE

George H. Lee, Troy, N. Y.

Application May 21, 1949, Serial No. 94,617

20 Claims. (Cl. 235—86)

This invention relates generally to fertility computing devices which are adapted to have set into them information as to the date upon which the preceding menstruation began and information as to the menstrual cycle characteristic (probable length and probable irregularity) of the user, and to thereupon automatically compute and display information as to the probable fertility dates of the current cycle, in accordance with the Ogino-Knaus biological law of reproduction, commonly referred to as the "rhythm" system.

The present invention is specifically concerned with improvements in that particular type of fertility computing device which is box-like in construction and three-dimensional in character, as exemplified by the device disclosed in U. S. Patent No. 2,465,238, entitled "Periodic Computing Device," issued March 22, 1949, in the names of Laux and Ward. Such a three-dimensional type of fertility computing device is characterized by a time or record tape mounted on and extending between a pair of spaced rollers which, in turn, are pivotally mounted within a supporting box-like structure. The time tape is provided with equally spaced indicia designating consecutive days of the year. A visual menstruation day reference or index is provided whereby the time tape may be manually moved so that it occupies a unique position with respect to the supporting structure depending upon the date of the beginning of the last menstruation. Associated with the time tape is a movable fertility indicating means which indicates on the time tape the dates of fertility in the current reproduction or menstrual cycle, the indicating means being so constructed and arranged that it is adapted to indicate different relative portions of the tape and different lengths of the tape depending upon its position. Visual reference means are also provided for adjusting the fertility indicating means to that particular position which corresponds to the particular menstrual cycle characteristic of the user.

It is a primary object of the present invention to provide a design for a fertility computing device of the above-described type, the operation of which is less critically dependent upon accuracy and alignment of parts during construction, and is therefore less expensive to manufacture and more trustworthy in performance.

Another object is to provide a design for a fertility computing device which is easier to operate and to understand and which is less apt to confuse the user.

Still another object is to provide an instrument which includes not only the fertility computing device, itself, but also, in convenient and compact form, all incidental and auxiliary items which are necessarily employed in the continuous use of the "rhythm" system.

A further object is to provide a design for a fertility computing device wherein the chances for alteration of the settings of the device, as a result of accident or tinkering by strangers, is greatly reduced.

A still further object is to provide a device of the character described, the purpose of which is not externally evident, thereby reducing the possibility of embarrassment to a user.

A more specific object of the invention is to provide a fertility computing device of the above-described type wherein the menstruation day reference or index is located directly upon the fertility indicating means, itself.

Another object is to provide a fertility computing device wherein two separate and independently movable fertility indicating means are provided, one indicating the beginning of the fertile period and the other indicating the termination of the fertile period, each of these separate indicating means having independent positional adjustments and visual reference means whereby the first indicating means may be positioned in accordance with the minimum number of days to be expected in the user's cycle and the other may be adjusted in accordance with the maximum number of days to be expected in the user's cycle.

Another object of the invention is to provide a fertility computing device wherein the fertility indicating means comprises a mask covering portions of the time tape.

A further object of the invention is to provide a fertility computing device wherein all days on the time tape are covered from view excepting the fertile or baby days.

Still another object is to provide a fertility computing device wherein the three items of information, that is, the date on which the last menstruation started, the menstrual cycle characteristic data, and the fertile period, are each displayed on separate and distinct parallel lines of the device, thereby preventing any possibility of confusion in its use.

Other objects and advantages of the invention will become apparent as the description proceeds.

Figures 18, 19:
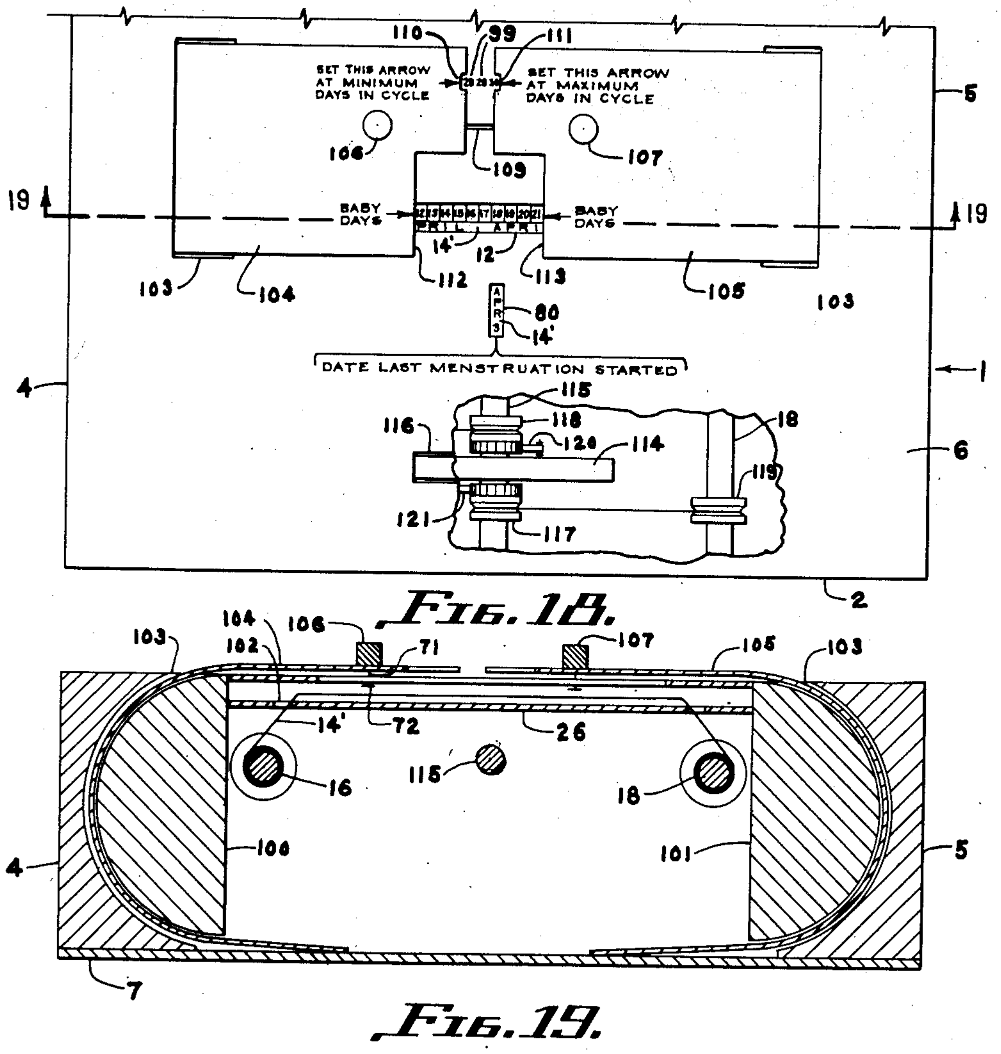
Fig. 18 is a plan view with a portion cut away, of still another modification of the present invention.

And Fig. 19 is a sectional view taken along the line 19—19 of Fig. 18.

Identical reference numerals are employed in all of the above figures to represent corresponding or identical elements.

Referring now to Figs. 1 through 6, the basic supporting structure for the device comprises a generally rectangular box designated generally at 1, the box having front wall 2, rear wall 3, side walls 4 and 5, top 6 and bottom 7. The bottom 7 of the box extends forwardly and to both sides beyond the walls of the box a short distance so as to provide a projecting surface 8 as shown.

The top of the box has attached to it a pad 9 appropriately lined and labelled for month to month recording of the date upon which menstruation began and the number of days in the corresponding menstrual cycle. Also attached to the box is a clip 10 adapted to receive and retain a pencil 11. The pad and pencil are convenient accessories for the device since it is generally desirable, in employing the "rhythm" system, to maintain a current record of the length of the menstrual cycle in order that the menstrual cycle characteristic setting may be checked and changed should changes occur in the cycle characteristic of the user.

The top of the box has an opening or window 12 through which the displayed information as to the fertility or baby days may be seen, as will later be explained in detail. Another opening or window 13 is provided in the top of the box to serve as a reference or index for the menstrual cycle characteristic of the user, as will also later be explained. The top of the box also has imprinted thereupon the legend "Date menstruation starts" above and near the left side of window 12. Another legend "These are the baby days" is imprinted on the top of the box directly above and substantially centrally located with respect to the window 12. This latter legend has associated with it a printed bracket 31, the apex of which terminates at the window 12. To the left of the window 13 is imprinted the legend "For menstrual cycle" and to the right of the window 13 is imprinted the legend "Days."

Figures 1, 2, 3, 4, 5, 6:
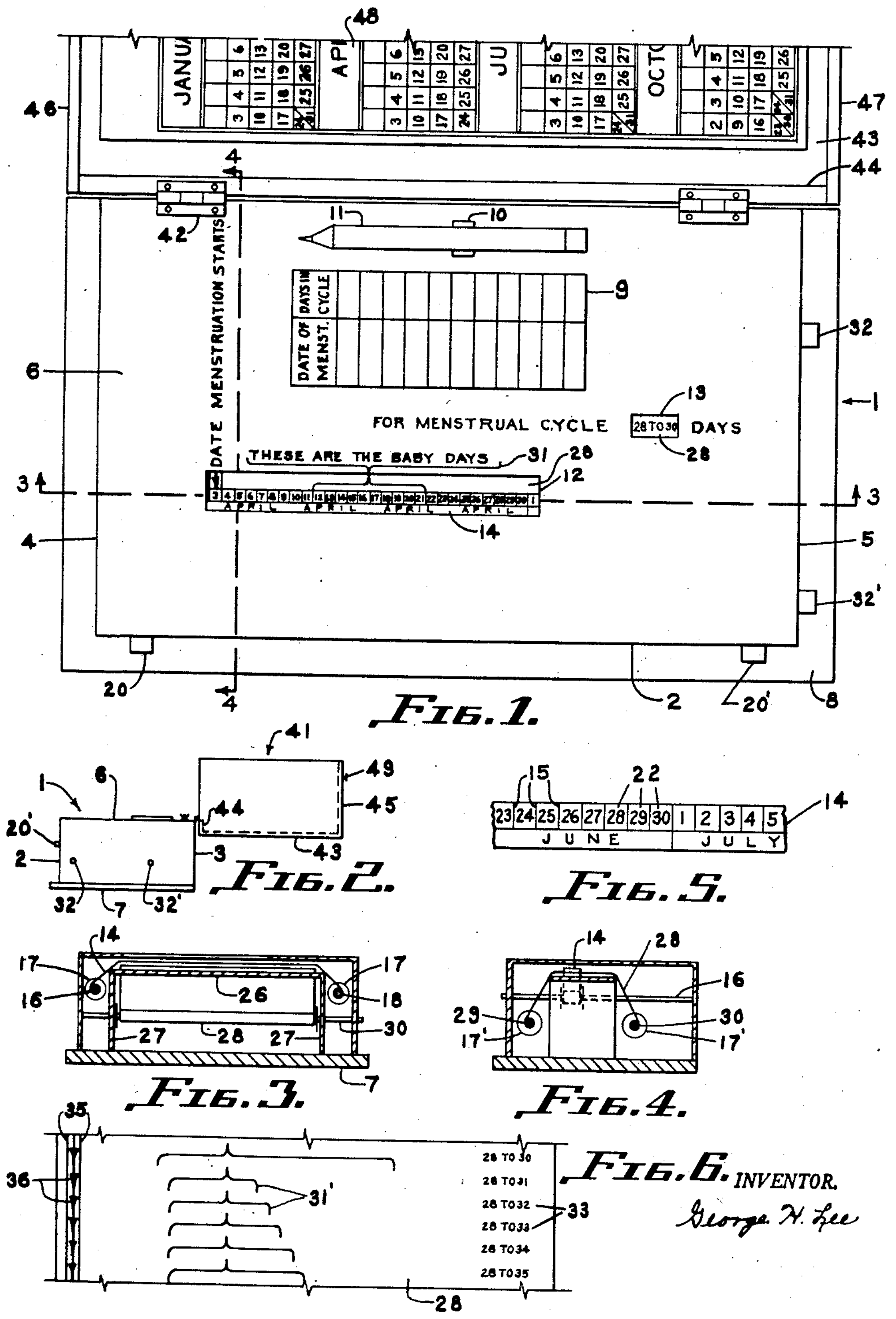
Fig. 1 is a plan view with a portion cut away of the preferred form of the present invention.
Fig. 2 is a side elevation view of Fig. 1.
Fig. 3 is a sectional view taken along the line 3—3 of Fig. 1.
Fig. 4 is a sectional view taken along the line 4—4 of Fig. 1.
Fig. 5 is a view of a representative portion of the time tape employed in Fig. 1.
Fig. 6 is a view of a representative portion of the fertility indicating means employed in Fig. 1.

As is shown in Fig. 5, the time tape 14 is divided, as by equally spaced parallel transverse lines 15, into equal portions corresponding to the consecutive days of the year. Each of these equal portions have imprinted thereon appropriate indicia 22 designating the consecutive days of the year. Time tape 14 has its left end attached to and wound around a shaft or drum 16, which shaft has attached thereto a pair of retaining collars 17 which serve as a guide for the time tape 14. In a similar manner, the right end of time tape 14 is attached to and wound around shaft or drum 18, which shaft also has a pair of similar collars 17. Shafts 16 and 18 are pivotally supported in the walls of box 1 near the left and right ends, respectively, of the box. The forward ends of shafts 16 and 18 extend through the front wall 2 of the box for a short distance, the extending portions forming manual control knobs 20, 20' permitting manual adjustment of the time tape 14. The time tape 14 occupies a position within the box so as to be aligned with the forward portion of window 12, as seen in Fig. 1. A shelf 26 is provided within the box to serve as a support for the time tape 14 as it passes beneath window 12, shelf 26 being shown as supported, in this case, by means of uprights 27, which uprights, in turn, are attached to the bottom of the box.

The fertility indicating means, in this case, comprises a fertility indicating tape 28, which is shown in detail in Fig. 6. Tape 28 has its opposite ends attached to and wound around shafts 29 and 30, respectively, these shafts being transversely spaced within the box, as shown in Fig. 4. Shafts 29 and 30 are each provided with a pair of retaining collars 17 which serve as a guide for the fertility indicating tape 28. Shafts 29 and 30 are pivotally supported in side walls 4 and 5, both of these shafts extending through right side wall 5 for a short distance to form manual control knobs 32 and 32', which knobs are used to control the position of fertility indicating tape 28. As may be seen best in Fig. 4, the fertility indicating tape 28 is so located within the box that it passes between the time tape 14 and the supporting shelf 26. Window 12, in this form of the invention, is somewhat wider than the time tape 14. Thus, a rectangular section of the fertility indicating tape is visible through the rearward portion of window 12 directly adjacent the visible portion of time tape 14.

As shown in Fig. 6, the fertility indicating tape 28 has a series of fertility indicating indicia imprinted thereon at spaced points along the indicating tape, these indicia taking the form, in this instance, of brackets 31', the apices of which are aligned with the apex of bracket 31 on the top of the box. The brackets 31′ are of various lengths and occupy various longitudinal positions, the various lengths and positions corresponding to particular menstrual cycle characteristics for which the device may be set. Also equally spaced along the fertility indicating tape 28 near the right end thereof, are a series of indicia 33 designating particular menstrual cycle characteristics, these indica being located so that a particular one of them will be visible through the window 13, depending upon the position of indicating tape 28.

Near the left end of the fertility indicating tape 28 are a pair of straight lines 35 which extend along the length of the tape and which serve as a menstruation day reference or index for the tape 14. A series of equally spaced arrows 36 may be centrally located between lines 35 such that a particular one of these arrows will appear directly beneath the legend "Date menstruation starts" on the top of the box, as shown in Fig. 1.

In operation, manual control knobs 32 and/or 32′ are rotated so as to cause the fertility indicating tape 28 to take a position such that the particular menstrual cycle characteristic (in this case 28 to 30 days) of the user is visible through window 13. Thereafter, by means of control knobs 20 and/or 20′, the time tape 14 is positioned such that those transverse lines 15 which enclose the actual date on the tape upon which the last menstruation started (in this case, April 3) are aligned with the index lines 35 of the fertility indicating tape 28. When this has been accomplished, that single bracket 31′ of the fertility indicating tape 28 which is visible through window 12 will set apart the days on the time tape 14 which are the fertile or baby days (in this case, April 12 through April 21).

It will be apparent that since the portions of fertility indicating tape 28 which are visible through windows 12 and 13, respectively, are offset in a transverse direction from one another, each bracket 31′ and its associated indicia 33 will also necessarily be offset from one another in a transverse direction by the same amount.

A distinct advantage arises from the facts that the menstruation day index (lines 35) is imprinted on the fertility indicating tape, itself, and that time tape 14 carries the transverse lines 15. It will be apparent that, this being the case, accurate alignment of the fertility indicating means (brackets 31′, in this case) with the proper portion of time tape 14 is necessarily assured by virtue of the manual alignment of the menstruation day reference index lines 35 with the lines 15 which enclose the date upon which the last menstruation started. Thus, no really critical alignment or orientation of fertility indicating tape 28 and its associated supporting shafts 29 and 30 with respect to the box itself is required during the manufacture and construction of the device.

A cover 41 is provided for the box, the cover being attached by means of hinges 42. The cover 41 is provided with closed top 43, rear wall 44, front wall 45, and side walls 46 and 47. A calendar 48 may be attached to the inside surface of the top 43 so as to be visible when the cover is raised. A knob 49 is provided on the front wall 45 of the cover to facilitate raising and lowering same. A catch may, of course, also be provided, if desired. Rear wall 44 is of a length adapted to be flush with the top of the box when the cover is lowered, whereas front wall 45 and side walls 46 and 47 are elongated and positioned outwardly of the top of the box so as to be flush with the projecting surface 8 at the bottom of the box when the cover is lowered.

It will be apparent, therefore, that when the cover 41 is in its lowered position, there is no external indication at all of the purpose of the entire device. This circumstance is desirable from the standpoint of avoiding embarrassment to the user, and avoiding curiosity and the desire to investigate on the part of strangers. The overhanging side wall 47 and overhanging front wall 45 also serve as a protection for manual control knobs 20, 20′, 32 and 32′, thereby avoiding the possibility of the settings being altered either by accident or by tinkering by strangers.

Figure 7:
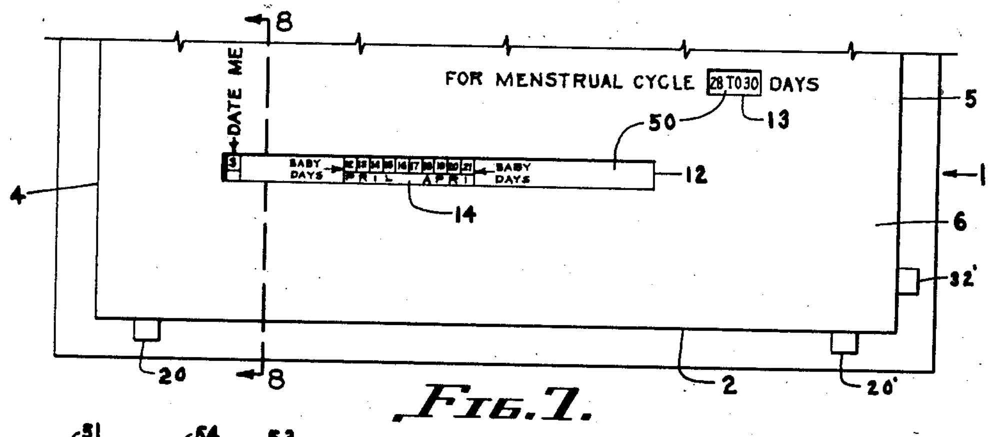
Fig. 7 is a plan view, with a portion cut away, of a modification of the present invention.
Figure 9:
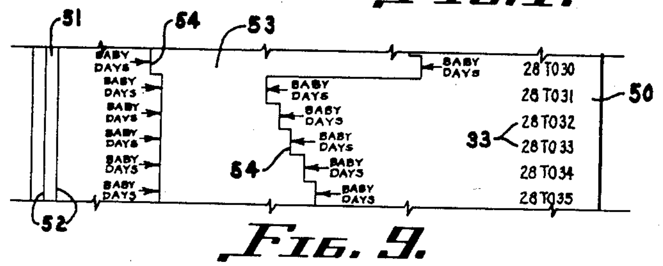
Fig. 9 is a view of a representative portion of the fertility indicating means employed in the modification of Fig. 8.
Figure 8:
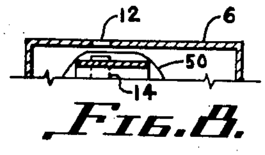
Fig. 8 is a sectional view, with a portion cut away, taken along the line 8—8 of Fig. 7.
Figure 10:
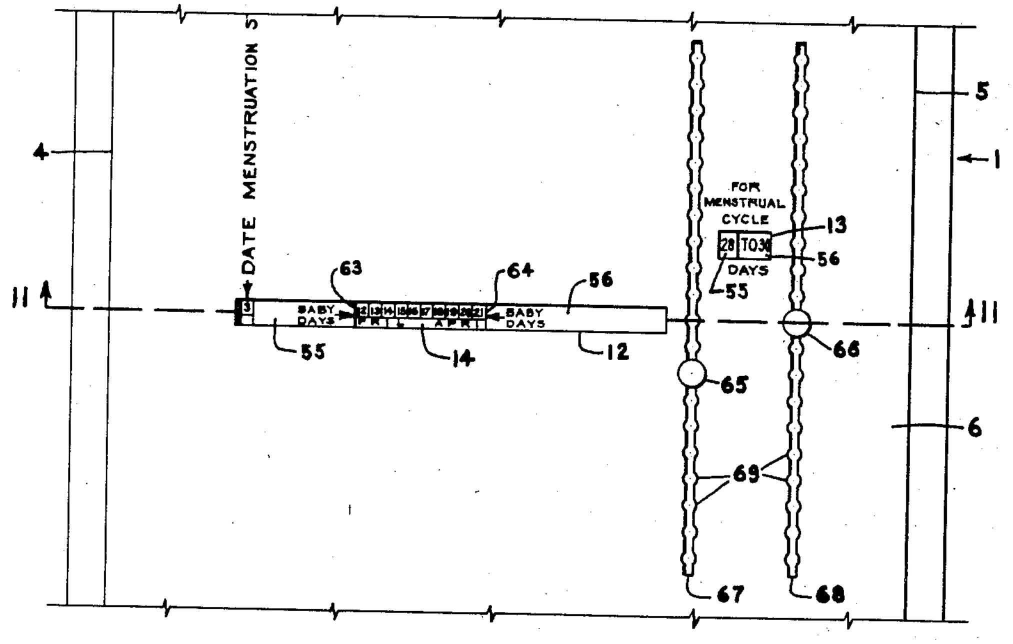
Fig. 10 is a plan view, with portions cut away, of another modification of the present invention.

The modification of the invention shown in Figs. 7 through 9 is generally similar to that shown in Figs. 1 through 6, the main points of distinction being the manner in which the information as to the fertility days are displayed and the type of the fertility indicating means employed. Thus, as shown in Fig. 9 the fertility indicating means, instead of being simply a paper tape with indica printed thereon as in Fig. 6, constitutes a masking tape 50 which is generally opaque but has certain transparent portions. One transparent portion is designated by reference numeral 51 and is bounded by straight lines 52. 53 designates another transparent portion, this portion being bounded by irregular lines 54, which lines serve to divide transparent portion 53 into a series of rectangular sections each having a width at least equal to that of window 12. In this case, instead of the duration of the fertility period being indicated by brackets 31′, as in Fig. 6, it is indicated by the length of that section of the transparent portion 53 which is aligned with window 12 and time tape 14.

In this case, the width of window 12 is substantially equal to the width of time tape 14 so that no portion of masking tape 50 forward or rearward of the time tape 14 is visible through window 12. Also, as shown in Fig. 8, the masking tape 50, in this case, passes over, rather than underneath, time tape 14, thereby masking from view that portion of the time tape which lies underneath an opaque portion of masking tape 50.

The operation, of course, is identical with that described with respect to the preceding form of the invention. The masking tape 50 is adjusted in position until that one of indicia 33 which corresponds to the menstrual cycle characteristic of the user is visible through window 13. Thereafter, the time tape 14 is adjusted in position until the date upon which menstruation began may be seen through the window 12 and the transparent portion 51 of the masking tape 50. The fertile or baby days will then be visible through window 12 and the transparent portion 53 of tape 50. As shown, the legend "Baby days," with an arrow pointing inwardly, may be printed on the masking tape 50 outwardly of and adjacent each of the rectangular sections of transparent portion 53. It will be apparent that, in this case, there is no need for the legend "These are the baby days" and the bracket 31 on the top of the box, and these features are therefore omitted.

A distinct advantage of this form of the invention arises from the fact that the fertility or baby days are set forth by themselves, and the adjoining non-fertile days are not even visible. Thus, the displayed information is more readily assimilated and the possibility of confusion or mistake on the part of the user is reduced.

Figure 11:
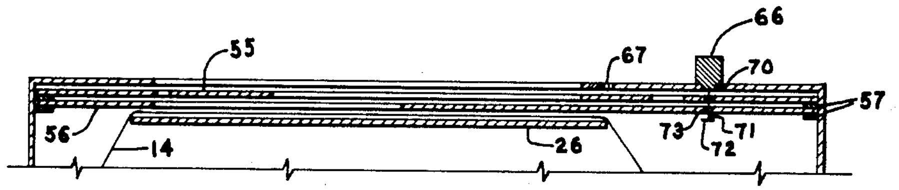
Fig. 11 is a sectional view, with a portion cut away, taken along the line 11—11 of Fig. 10.
Figure 12:
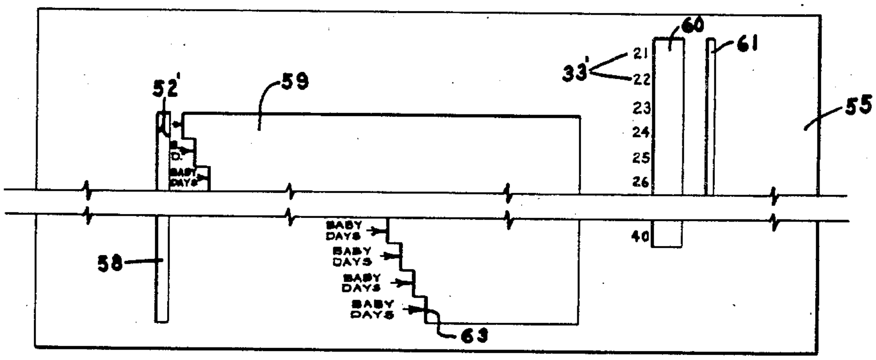
Fig. 12 is a plan view, with an interior portion cut away, of one of the two fertility indicating means employed in the modification of Fig. 10.
Figure 13:
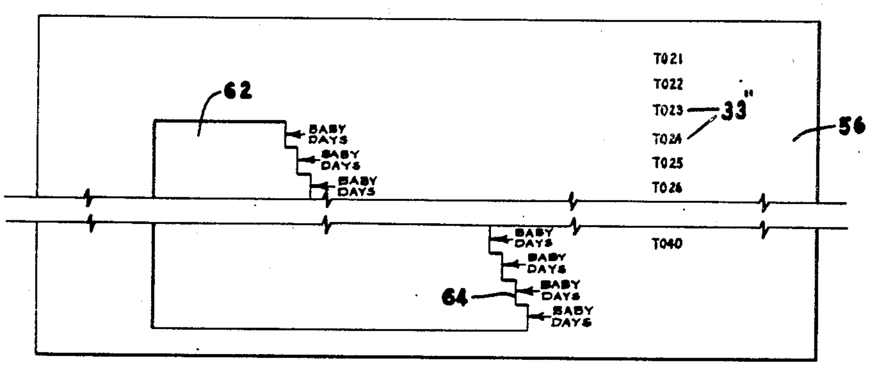
Fig. 13 is a plan view, with an interior portion cut away, of the other fertility indicating means employed in the modification of Fig. 10.
Figure 14:
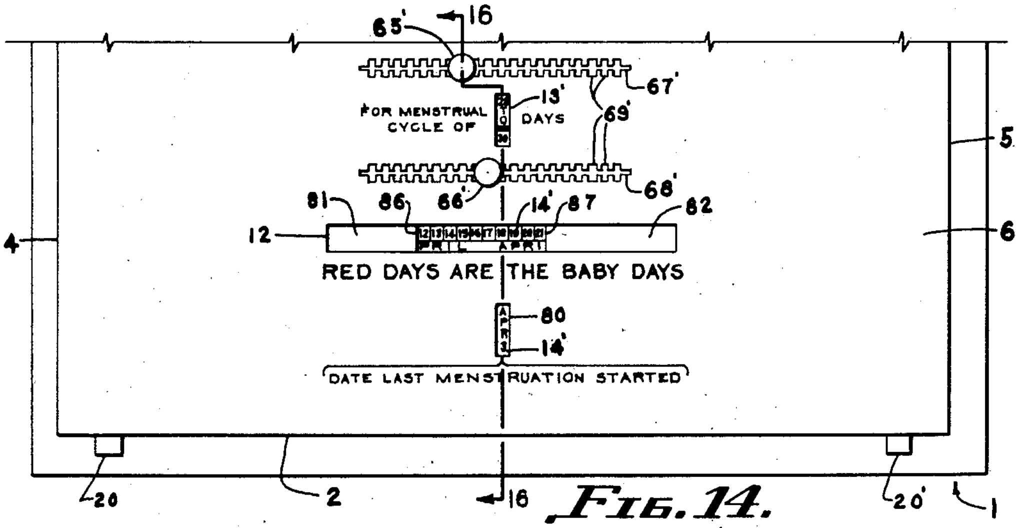
Fig. 14 is a plan view, with a portion cut away, of still another modification of the present invention.

Referring now to the modification of the invention which is shown in Figs. 10 through 13, the pertinent information is displayed in exactly the same manner as it was in the modification of Figs. 7 through 9. In this case, however, the construction and form of the fertility indicating means and its method of manual control is different. In this modification of the invention, the fertility indicating means comprises two separate and distinct independently movable masks 55 and 56. These masks are preferably formed of fairly stiff material, such as cardboard, are rectangular in outline, and have certain windows or openings cut therein. Both of these masks extend longitudinally the full length of the box and are slidably supported at side walls 4 and 5 by means of riders 57 for movement in a transverse direction. As shown in Fig. 11, both of these masks are positioned between the top of the box and time tape 14, mask 55 being positioned above mask 56. In this case, since the fertility indicating means does not take the form of a tape, the shelf 26 which supports the time tape 14 may simply be supported at its ends by the front and rear walls 2 and 3 of the box 1.

Mask 55 has four windows or openings designated respectively by reference numerals 58, 59, 60, and 61, whereas mask 56 has a single opening or window 62. The left and right boundaries or edges 52′ of window 58 provide the menstruation day index by means of which the time tape 14 is adjusted to its proper position such that the date of menstruation is visible through windows 12, 58 and 62. Window 59 of mask 55 has an irregularly shaped lefthand boundary or edge 63 which serves to define the beginning of the fertility period. Window 62 of mask 56 has an irregularly shaped righthand boundary or edge 64 which serves to define the termination of the fertility period.

Masks 55 and 56 have equally spaced thereon in a transverse direction a series of indicia 33′ and 33″, respectively, designating the various possible number of days in a menstrual cycle, for example, from 21 to 40. The indicia 33′ on mask 55 are employed to define the minimum number of days in the user's cycle, and the indicia 33″ on mask 56 are employed to define the maximum number of days in the user's cycle. The cycle indicia 33′ on mask 55 may be viewed through the left portion of window 13 while the cycle indicia 33″ on mask 56 may be viewed through the righthand portion of window 13 and window 60 of mask 55. The fertile days may be viewed on time tape 14 through window 12 and windows 59 and 62. As shown, the legend "Baby days," with an arrow pointing inwardly, may be printed on masks 55 and 56 outwardly adjacent each of the rectangular sections of windows 59 and 62 which are formed by irregular edges 63 and 64, respectively.

Pegs 65 and 66 are employed to manually adjust the position of masks 55 and 56, respectively, such that the appropriate menstrual cycle characteristic appears through window 13. The top 6 of box 1 is provided with a pair of transverse slots 67, 68, which slots interconnect a series of circular holes 69 arranged along the slots, these circular holes 69 having a diameter greater than the width of the slots but less than that of pegs 65, 66. The number of circular holes 69 arranged along each slot is equal to the number of cycle indicia 33′, that is, twenty.

Pegs 65, 66 are each provided at their bottom with circular lugs 70 adapted to fit within the circular openings 69. Extending from the bottom of peg 66 is a pin 71 having a head 72. Pin 71 is aligned with opening 61 of mask 55 so that peg 66 may be moved without effect on mask 55. (See Fig. 11.) Pin 71 also extends through a small hole 73 in mask 56, hole 73 having a diameter smaller than that of head 72. Thus, it will be apparent that mask 56 may be moved to any desired transverse position, corresponding to the maximum number of days in the user's cycle, by raising pin 66 sufficiently that lug 70 is removed from its circular opening 69, sliding the pin 66 to the circular opening 69 corresponding to the desired position, and then releasing the pin so that the lug 70 engages a new circular opening 69. Although not shown, it will be understood that the arrangement for adjusting the position of mask 55 is similar to that described for mask 56, peg 65 having a similar lug 70, pin 71 and head 72, the pin having associated with it a hole in mask 55 similar to hole 73 of mask 56.

In operation, mask 55 is adjusted in position by means of peg 65 until the minimum number of days in the user's cycle apears at the left of window 13, and mask 56 is adjusted in position until the maximum number of days in the user's cycle appears at the right of window 13. The time tape 14 is then adjusted until the date upon which menstruation began is visible through windows 12, 58, and 62. The fertile or baby period is then visible through windows 12, 59 and 62, the beginning of the fertile period being defined and controlled by the irregular lefthand boundary 63 of window 59 in mask 55, and the termination of the fertile period being defined and controlled by the irregular righthand boundary 64 of window 62 in mask 56.

It is desirable to place a limitation on the relative positions of masks 55 and 56 so as to prevent the order of the information displayed through window 13 from being reversed as regards the minimum and maximum number of days in the user's cycle. If for example, the user set into the device the cycle date "30 to 28" rather than "28 to 30," the information displayed as to the fertile days would be in error. Accordingly, in order to prevent this possibility, the opening 61 in mask 55 is terminated at a point (not shown) in the forward direction which is directly opposite the point at which the pin 71 associated with peg 65 extends through the hole in mask 55. Thus, it will be impossible for peg 66 to be moved to a position forward of peg 65. Accordingly, that indicia 33″, which is visible through window 13, will never be lower numerically than that indicia 33′ which is visible through window 13.

It will be apparent that by virtue of employing two fertility indicating means, as has been done in the modification of Figs. 10 through 13, the complications introduced by the rollers 29 and 30 and their associated fertility indicating tape or masking tape are eliminiated. Furthermore, the amount of adjustment necessary to obtain the desired menstrual cycle characteristic is in most cases substantially shortened by this feature. Another advantage of the present modification of the invention is that the positional adjustment of the fertility indicating means is not susceptible to being changed by accident.

Figure 17:
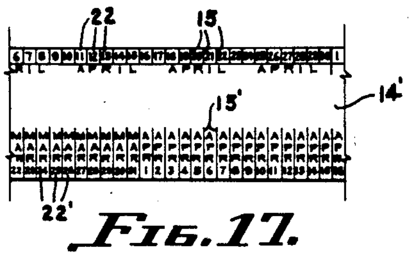
Fig. 17 is a view showing a representative portion of the modified form of time tape which is employed in the modification of Fig. 14.

Referring now to the form of the invention shown in Figs. 14 through 17, a modified form of time tape, designated 14', is employed, as specifically shown in Fig. 17. Tape 14' is wider than previously described time tape 14, and, in addition to the series of indicia 22 designating consecutive days of the year, it has a second series of equally spaced indicia 22' also designating consecutive days of the year and extending along its lower edge, these lower indicia being separated by equally spaced vertical lines 15'. This lower series of indicia 22', besides being displaced transversely from the upper series, is also displaced longitudinally from the upper series, as shown. The lower series of indicia 22' is employed solely for the purpose of defining the date upon which the last menstruation began in the positional reference system for tape 14'. For this purpose, an additional window 80 is provided in the top 6 of the box 1, this window 80 serving as the menstruation day index for the positional reference system which defines the location of time tape 14'.

The top of the box, as before, has a window 12 through which the fertile or baby days are visible. Printed beneath window 12 is the legend "Red days are the baby days." Printed beneath window 80 on the top of the box is the legend "Date last menstruation started." Centrally positioned above window 12 is another window 13', which window constitutes the index for defining the position of the fertility indicating means. To the left of window 13' is printed the legend "For menstrual cycle of" and to the right of window 13' is printed the legend "Days."

Figure 15:
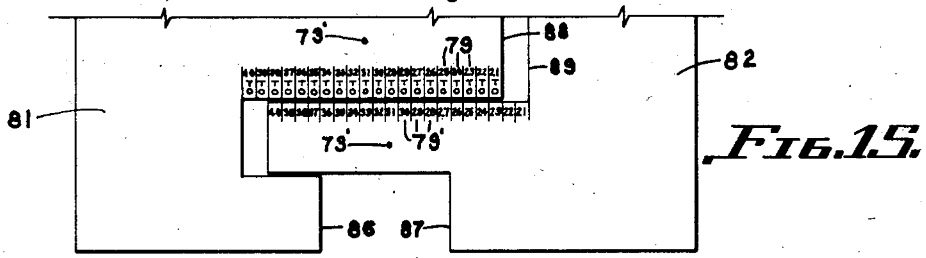
Fig. 15 is a plan view, with a portion cut away, of the two fertility indicating means shown in their operative spatial relationship, as they are employed in the modification of Fig. 14.
Figure 16:
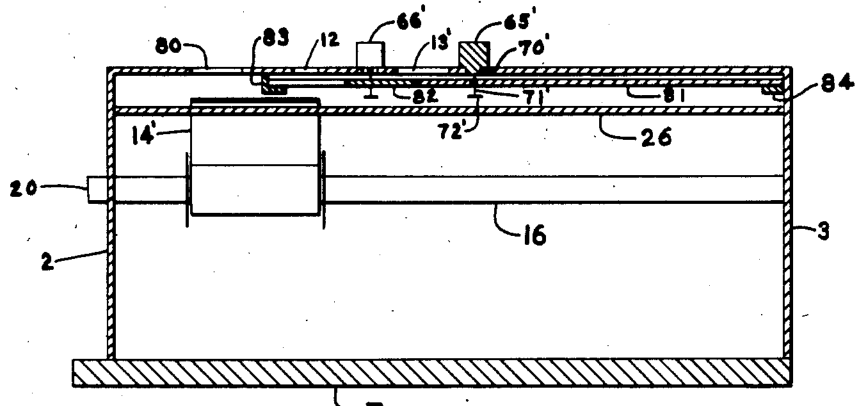
Fig. 16 is a sectional view taken along the line 16—16 of the Fig. 14.

As specifically shown in Fig. 15, the fertility indicating means comprises two masks 81 and 82, the masks, in this case, being movable longitudinally rather than transversely, lying in the same horizontal plane, and being solid except for small holes 73'. Masks 81 and 82 are slidably supported beneath the top of the box and above the tape 14'. The forward edge of masks 81 and 82 engages a rider 83 depending from the top of the box. The rearward edge of masks 81 and 82 may extend to the rear wall of the box and be there supported by rider 84.

Pegs 65' and 66' are provided for the manual control of the positions of masks 81 and 82, respectively. These pegs have associated therewith at their bottoms protruding lugs 70' similar to lugs 70 of Fig. 11 except that in this case the lugs are rectangular in cross section. Also associated with pegs 65' and 66' are pins 71', having heads 72', these pins being adapted to slide along longitudinally extending slots 67' and 68' formed in the top of the box. Pins 71' engage their respective masks 81 and 82 at holes 73'. A series of rectangularly shaped openings 69' are arranged along slots 67' and 68', these openings being adapted to receive lugs 70'. Thus, the longitudinal position of masks 81 and 82 may be controlled by pegs 65' and 66', respectively, in the same manner as was previously described with respect to the positional control of masks 55 and 56 of Figs. 12 and 13, respectively.

Mask 81 has a longitudinally extending series of equally spaced indicia 79 designating the various possible number of days in the menstrual cycle, these indicia 79 being positioned on mask 81 such that a particular one of them is visible through the upper portion of window 13'. In a similar manner, mask 82 has a longitudinally extending series of equally spaced indicia 79' also designating the various possible number of days in the cycle, this series of indicia 79' being disposed on mask 82 such that a particular one of them is visible through the lower portion of window 13'. Masks 81 and 82 have transversely extending inwardly facing edges 86 and 87, respectively, so positioned on the masks that they traverse the entire width of window 12, as may be seen in Fig. 14. Masks 81 and 82 continue outwardly of edges 86 and 87, respectively, a sufficient distance to extend beyond the outer extremities of window 12 in all possible positions of the masks. Masks 81 and 82 also have inwardly facing cooperating edges 88 and 89, respectively, which operate to restrict relative movement of the masks such that the order of the minimum and maximum cycle designations which appear through window 13' cannot be reversed.

In operation, mask 81 is manually positioned by means of peg 65' such that the minimum number of days in the user's cycle is visible through the upper portion of window 13'. Mask 82 is similarly positioned by means of peg 66' such that the maximum number of days in the user's cycle is visible through the lower portion of window 13'. Thereafter, time tape 14' is positioned by means of knobs 20 and/or 21 such that the date upon which the last menstruation began is visible through window 80. This having been accomplished, the fertile or baby days are visible through window 12 between edges 86 and 87 of masks 81 and 82, respectively.

It will be apparent that a fertility computing device constructed according to the design of Figs. 14 through 17 is easier to understand and less confusing to use due to the fact that the three pertinent items of information are each displayed on separate parallel lines at the top of the box. Furthermore, since the upper series of indicia 22 of time tape 14' never serve any other purpose than to display the baby or fertile days, the entire longitudinally extending section on which indicia 22 are printed may be given some distinguishing color or mark (red in this case), which distinguishing color or mark may be reserved for the exclusive purpose of displaying fertile days. It is also evident that the fertility indicating means (masks 81 and 82) are substantially less complicated, and therefore easier and cheaper to manufacture, than the fertility indicating means of prior art devices or of the preceding forms of the invention.

Referring now to the form of the invention shown in Figs. 18 and 19, a time tape 14' identical to that shown in Fig. 17 is employed, upper and lower portions of this time tape being visible through windows 12 and 80, respectively, in the same manner as was discussed with respect to the modification of Figs. 14 through 17. The shelf 26, which supports the time tape 14', in this case is supported at its ends by transversely extending semi-cylindrical inserts 100 and 101 mounted within the box. Shelf 26 has slots 102 adapted to accommodate tape 14'. The left and right side walls 4 and 5 of the box, in this case, are thickened and terminate in concave surfaces contiguous and cooperating with the convex surfaces of inserts 100 and 101, respectively, so as to form semi-cylindrical passageways 103 extending from the top of the box downwardly into the interior thereof.

The fertility indicating means in this case comprises longitudinally movable masks 104 and 105, the inner extremities of which are adapted to be slid along above the top of the box. Pegs 106 and 107 are fixedly attached to masks 104 and 105, respectively, and have associated therewith pins 71 which are adapted to slide along a slot 109 cut in the top of the box. Pins 71 have associated heads 72 preventing the pins from being removed from slot 109. The outer extremities of masks 104 and 105 extend through passageways 103, whereby the masks are frictionally engaged and retained in any given position. For this purpose the masks 104 and 105 are constructed of fairly flexible yet resilient material, such as a thin plastic or a heavy paper.

Imprinted on the top of the box above window 12 is a longitudinally extending series of equally spaced indicia 99 designating the various possible number of days in a menstrual cycle from 21 to 40. Associated with indicia 99 are indices 110 and 111 located on masks 104 and 105, respectively. These indices 110 and 111 may take the form of inwardly facing edges of the masks 104 and 105, respectively, and they may have an arrow associated therewith, as shown. To the left of the index 110 on mask 104 is printed the legend "Set this arrow at minimum days in cycle," and to the right of the index 111 of mask 104 is printed the legend "Set this arrow at maximum days in cycle." Masks 104 and 105 are also provided with inwardly facing edges 112 and 113, respectively, which edges traverse window 12 and terminate forwardly somewhere between the upper indicia 22 and the lower indicia 22′ of time tape 14′, and thus serve to define the beginning and termination, respectively, of the fertile period. The legend "Baby days," with an arrow pointing inwardly, may be printed on masks 104 and 105 adjacent edges 112 and 113, as shown.

In this form of the invention, a somewhat different form of manual positional control for time tape 14′ is employed. A rotatable wheel 114 is mounted within the box on a shaft 115. Wheel 114 is of a diameter such that it extends upwardly a small distance beyond the top of the box through an aperture 116 cut in the top of the box for this purpose. Rotatably mounted on shaft 115 on opposite sides of wheel 114 are wheels 117 and 118. Wheel 117 has a string or rubber band drive connection to a wheel 119 which is fixedly attached to shaft 18. Similarly, wheel 118 has a string or rubber band drive connection to a similar wheel 119 fixedly attached to shaft 16. A pawl and ratchet mechanism, indicated schematically at 120, operatively connects wheel 114 and wheel 118 in response to rotation of wheel 114 to the left, looking down on Fig. 18. A similar pawl and ratchet mechanism 121 is provided to operatively connect wheel 114 to wheel 117 in response to rotation of wheel 114 to the right, looking down on Fig. 18. It will be apparent, therefore, that the single control wheel 114 may be employed to rotate shaft 16 if it is desired to move tape 14′ to the left, and the same wheel may be employed to rotate shaft 18 if it is desired to move tape 14′ to the right.

In the operation of the form of the invention shown in Figs. 18 and 19, mask 104 is moved by means of peg 106 such that its index 110 is positioned immediately adjacent and to the left of that particular indicia 99 which corresponds to the minimum number of days in the user's cycle. In a similar manner, mask 105 is positioned by means of peg 107 such that its index 111 is positioned immediately adjacent and to the right of that particular indicia 99 which corresponds to the maximum number of days in the user's cycle. Time tape 14′ is then positioned by means of control wheel 114 such that the date upon which the last menstruation began is visible through window 80. The fertile or baby days then appear between edges 112 and 113 of masks 104 and 105, respectively.

It will be apparent that in this form of the invention there are no control knobs protruding beyond the walls of the box. That is, all adjustments are made at the top of the box. Accordingly, walls 45, 46, and 47 of the cover are preferably made equal in length to wall 44 (see Fig. 2) so that all walls of the cover will lie flush with the top of the box when the cover is lowered. For the same reason the bottom 7 of the box is made flush with the side walls of the box, eliminating the projecting surface 8 of Fig. 1.

By means of the design of Figs. 18 and 19 it is possible to retain the simplifications inherent in the design of Figs. 14 through 17 while substantially reducing the overall length of the entire box. The advantages of providing a single manual control (wheel 114) for the time tape are readily apparent.

Since many changes could be made in the above construction, and many apparently widely different embodiments of this invention could be made without departing from the scope thereof, it is intended that all matter contained in the above description, or shown in the accompanying drawings, shall be interpreted as illustrative and not in a limiting sense. It will be apparent that many of the novel features described above with respect to one or more of the modifications may be incorporated in one or more of the other modifications, and that the various novel features may be rearranged and combined with other novel features by one skilled in the art without departing from the principles of the invention. As just one example of what is meant, it is perfectly obvious that the unitary control means for adjusting the position of the time tape, although disclosed only with respect to the modification of Figs. 18 and 19, may just as advantageously be employed in any of the other modifications. It should be understood also that openings which are employed only for the purpose of permitting vision therethrough, are the full equivalents of corresponding solid but transparent areas, and vice versa.

What is claimed is:

1. In a device of the character described, a support, a pair of longitudinally spaced rollers pivotally mounted on said support, a time tape mounted on and extending longitudinally between said rollers, said time tape having equally spaced indicia designating consecutive days of the year, movable indicating means operatively associated with said tape for indicating, as a fertile period, a variable portion of said tape depending upon the position of said indicating means, said indicating means bearing an index at a fixed longitudinal position for defining a particular day of said time tape as the date menstruation started, and visual positional reference means associated with said indicating means for visibly defining the position of said indicating means in terms of the particular menstrual cycle characteristic associated with its particular position.

2. In a device of the character described, a support, a pair of spaced rollers pivotally mounted on said support, a time tape mounted on and extending between said rollers, said time tape having equally spaced indicia designating consecutive days of the year, movable indicating means operatively associated with said tape for indicating, as a fertile period, a variable portion of said tape depending upon the position of said indicating means, said indicating means including means for covering from view portions of said tape immediately adjacent opposite ends of said fertile period, and visual positional reference means associated with said indicating means for visibly defining the position of said indicating means in terms of the particular menstrual cycle characteristic associated with its particular position.

3. In a device of the character described, a support, a pair of longitudinally spaced rollers pivotally mounted on said support, a time tape mounted on and extending between said rollers, said time tape having equally spaced indicia designating consecutive days of the year, a pair of transversely spaced rollers pivotally mounted on said support, a masking tape mounted on and extending between said transversely spaced rollers, said masking tape passing over said time tape, said masking tape having arranged in series along it a series of transparent portions of variable length and position, whereby variable portions of said tape are exposed to view depending upon the position of said masking tape, and visual positional reference means associated with said masking tape for visibly defining the position of said masking tape in terms of the particular menstrual cycle characteristic associated with its particular position.

4. In a device of the character described, a support, a pair of spaced rollers pivotally mounted on said support, a time tape mounted on and extending between said rollers, said time tape having equally spaced indicia designating consecutive days of the year, a first movable indicating means operatively associated with said tape for indicating, as the beginning of the fertile period, a variable point on said tape depending upon the position of said indicating means, visual positional reference means associated with said first indicating means for visibly defining the position of said first indicating means in terms of a minimum possible menstrual cycle, a second movable indicating means operatively associated with said tape for indicating, as the termination of the fertile period, a variable point on said tape depending upon the position of said indicating means, and visual positional reference means associated with said second indicating means for visibly defining the position of said second indicating means in terms of a maximum possible menstrual cycle.

5. Apparatus, as claimed in claim 4, wherein said first and second indicating means have means associated therewith for limiting the relative movement of one with respect to the other.

6. Apparatus, as claimed in claim 4, wherein said indicating means are movable longitudinally of said tape.

7. Apparatus, as claimed in claim 4, wherein said indicating means are movable transversely of said tape.

8. In a device of the character described, a support, a pair of longitudinally spaced rollers pivotally mounted on said support, a time tape mounted on and extending between said rollers, said time tape having equally spaced indicia designating consecutive days of the year, a first transversely movable mask passing over said tape, said first mask having a series of transparent longitudinally extending portions beginning at variable points, visual positional reference means associated with said first mask for visibly defining the position of said first mask in terms of a minimum possible menstrual cycle, a second transversely movable mask passing over said tape, said second mask having a series of transparent longitudinally extending portions terminating at variable points, and visual positional reference means associated with said second mask for visibly defining the position of said second mask in terms of a maximum possible menstrual cycle, one of said masks passing above the other.

9. In a device of the character described, a support, a pair of spaced rollers pivotally mounted on said support, a time tape mounted on and extending between said rollers, said time tape having a first series of equally spaced indicia designating consecutive days of the year, movable indicating means operatively associated with said tape for indicating, as a fertile period, a variable portion of said first series depending upon the position of said indicating means, visual positional reference means associated with said indicating means for visibly defining the position of said indicating means in terms of the particular menstrual cycle characteristic associated with its particular position, said time tape having a second series of equally spaced indicia designating consecutive days of the year, said second series being offset longitudinally and transversely from said first series, and an index fixed with respect to said support for defining a particular day of said second series as the date menstruation started.

10. In a device of the character described, a support, a pair of spaced rollers pivotally mounted on said support, a time tape mounted on and extending between said rollers, said time tape having a series of equally spaced indicia designating consecutive days of the year, movable indicating means operatively associated with said tape for indicating, as a fertile period, a variable portion of said tape depending upon the position of said indicating means, said indicating means including means for covering from view all of the otherwise visible portion of said series of indicia save those designating the fertile days, and visual positional reference means associated with said indicating means for visibly defining the position of said indicating means in terms of the particular menstrual cycle characteristic associated with its particular position.

11. In a device of the character described, a support, a pair of longitudinally spaced rollers pivotally mounted on said support, a time tape mounted on and extending between said rollers, said time tape having equally spaced indicia designating consecutive days of the year, a first longitudinally movable mask passing over a variable portion of said tape to cover a variable leftmost portion of said tape depending upon the position of said first mask, visual positional reference means associated with said first mask for visibly defining the position of said first mask in terms of a minimum possible menstrual cycle, a second longitudinally movable mask passing over a variable portion of said tape to cover a variable rightmost portion of said tape depending upon the position of said second mask, and visual positional means associated with said second mask for visibly defining the position of said second mask in terms of a maximum possible menstrual cycle.

12. In a device of the character described, a generally rectangular box, a pair of longitudinally spaced rollers pivotally mounted within said box, a time tape mounted on and extending between said rollers along the top of said box, said time tape having equally spaced indicia designating consecutive days of the year, a first movable indicating means operatively associated with said tape at the top of said box for indicating, as the beginning of the fertile period, a variable point on said tape depending upon the position of said indicating means, a second movable indicating means operatively associated with said tape at the top of said box for indicating, as the termination of said fertile period, a variable point on said tape depending upon the position of said second indicating means, and visual positional reference means for visibly defining the position of said first and second indicating means in terms of a minimum and a maximum possible menstrual cycle, respectively, said reference means comprising a first series of spaced indicia disposed on said first indicating means and designating consecutively the number of days in progressively increasing menstrual cycles, a second series of spaced indicia disposed on said second indicating means and also designating consecutively the number of days in progressively increasing menstrual cycles, and an index fixed in position at the top of said box for defining a particular one of the indicia of said first series and a particular one of the indicia of said second series.

13. In a device of the character described, a generally rectangular box, a pair of longitudinally spaced rollers pivotally mounted within said box, a time tape mounted on and extending between said rollers along the top of said box, said time tape having equally spaced indicia designating consecutive days of the year, a first movable indicating means operatively associated with said tape at the top of said box for indicating, as the beginning of the fertile period, a variable point on said tape depending upon the position of said indicating means, a second movable indicating means operatively associated with said tape at the top of said box for indicating, as the termination of said fertile period, a variable point on said tape depending upon the position of said second indicating means, and visual positional reference means for visibly defining the position of said first and second indicating means in terms of a minimum and a maximum possible menstrual cycle, respectively, said reference means comprising a series of spaced indicia fixedly located at the top of said box and designating consecutively the number of days in progressively increasing menstrual cycles, an index disposed on said first indicating means for defining a particular one of the indicia of said series, and an index disposed on said second indicating means for defining a particular one of the indicia of said series.

14. In a device of the character described, a generally rectangular box, a pair of longitudinally spaced rollers pivotally mounted within said box, a time tape mounted on and extending between said rollers along the top of said box, said time tape having equally spaced indicia designating consecutive days of the year, a first longitudinally movable mask passing over a variable portion of said tape at the top of said box to cover a variable leftmost portion of said tape depending upon the position of said first mask, visual positional reference means associated with said first mask for visibly defining the position of said first mask in terms of a minimum possible menstrual cycle, a second longitudinally movable mask passing over a variable portion of said tape at the top of said box to cover a variable rightmost portion of said tape depending upon the position of said second mask, visual positional reference means associated with said second mask for visibly defining the position of said second mask in terms of a maximum possible menstrual cycle, and means forming a pair of passageways in said box disposed outwardly of said rollers for accommodating and guiding the outer extremities of said masks.

15. In a device of the character described, a generally rectangular box, a pair of spaced rollers pivotally mounted within said box, a time tape mounted on and extending between said rollers along the top of said box, said time tape having equally spaced indicia designating consecutive days of the year, movable indicating means operatively associated with said tape at the top of said box for indicating, as a fertile period, a variable portion of said tape depending upon the position of said indicating means, visual positional reference means associated with said indicating means at the top of said box for visibly defining the position of said indicating means in terms of the particular menstrual cycle characteristic associated with its particular position, a manual control wheel pivotally mounted within said box, the upper portion of said wheel protruding upwardly past the top of said box, the top of said box having an aperture adapted to accommodate the protruding portion of said wheel, a first ratchet drive operatively interconnecting said wheel and one of said rollers in response to rotation of said wheel in one direction, and a second ratchet drive operatively interconnecting said wheel and the other one of said rollers in response to rotation of said wheel in the other direction.

16. In a device of the character described, a support, a pair of longitudinally spaced rollers pivotally mounted on said support, a time tape mounted on and extending longitudinally between said rollers, said time tape bearing a series of equally spaced transverse lines dividing said tape into equal portions each representative of a day of the year, said portions bearing indicia designating the particular day represented by that portion, transversely movable indicating means operatively associated with said tape for indicating, as a fertile period, a variable portion of said tape depending upon the position of said indicating means, and visual positional reference means associated with said indicating means for visibly defining the position of said indicating means in terms of the particular menstrual cycle characteristic associated with its particular position, said indicating means having at a fixed longitudinal position a pair of transverse lineal indicia longitudinally spaced from one another by a distance exactly equal to the distance separating the transverse lines on said tape.

17. Apparatus, as claimed in claim 1, wherein said indicating means is movable in a transverse direction.

18. Apparatus, as claimed in claim 2, wherein said indicating means is movable in a transverse direction and carries an index at a fixed longitudinal position for defining a particular day of said time tape as the date menstruation started.

19. Apparatus, as claimed in claim 3, wherein said masking tape has an additional transparent portion running lengthwise thereof and having a width equal to the spacing of the indicia on said time tape.

20. Apparatus, as claimed in claim 4, further including visual positional reference means for defining the position of said time tape in terms of the particular menstruation starting date associated with its particular position.

GEORGE H. LEE.

References Cited in the file of this patent

UNITED STATES PATENTS

| Number | Name | Date |
|---|---|---|
| 328,221 | Hood | Oct. 13, 1885 |
| 455,161 | Brown | June 30, 1891 |
| 510,810 | Marks | Dec. 12, 1893 |
| 1,555,190 | Currin | Sept. 29, 1925 |
| 2,161,345 | Gates | June 6, 1939 |
| 2,465,238 | Laux et al. | Mar. 22, 1949 |
| 2,494,291 | Fay | Jan. 10, 1950 |

OTHER REFERENCES

Figure No. 5602 on page 433 of Keuffel & Esser & Co.'s catalogue, 33d edition, published in 1909. General Office and Factories at Hoboken, N. J.